United States Patent
Mirza Baig

(10) Patent No.: US 9,087,327 B2
(45) Date of Patent: Jul. 21, 2015

(54) AUTOMATICALLY EMAILING RECEIPT AT POS

(71) Applicant: Attaullah Mirza Baig, Austin, TX (US)

(72) Inventor: Attaullah Mirza Baig, Austin, TX (US)

(73) Assignee: EBAY INC., San Jose, CA (US)

( * ) Notice: Subject to any disclaimer, the term of this patent is extended or adjusted under 35 U.S.C. 154(b) by 126 days.

(21) Appl. No.: 13/757,314

(22) Filed: Feb. 1, 2013

(65) Prior Publication Data

US 2013/0198018 A1     Aug. 1, 2013

Related U.S. Application Data

(60) Provisional application No. 61/593,726, filed on Feb. 1, 2012.

(51) Int. Cl.
| | |
|---|---|
| *G06Q 20/00* | (2012.01) |
| *G06Q 20/20* | (2012.01) |
| *G06Q 20/04* | (2012.01) |
| *G07G 5/00* | (2006.01) |

(52) U.S. Cl.
CPC ............ *G06Q 20/20* (2013.01); *G06Q 20/0453* (2013.01); *G06Q 20/209* (2013.01); *G07G 5/00* (2013.01)

(58) Field of Classification Search
None
See application file for complete search history.

(56) References Cited

U.S. PATENT DOCUMENTS

| | | | |
|---|---|---|---|
| 5,744,787 A | 4/1998 | Teicher | |
| 7,720,764 B2 | 5/2010 | Emerson et al. | |
| 7,797,192 B2* | 9/2010 | Mitchell et al. | 705/16 |
| 7,987,120 B2 | 7/2011 | Shiftan et al. | |
| 7,991,694 B2 | 8/2011 | Takayama | |
| 2009/0313132 A1 | 12/2009 | McKenna et al. | |
| 2012/0203662 A1* | 8/2012 | Morgan et al. | 705/26.8 |
| 2012/0296741 A1* | 11/2012 | Dykes | 705/14.53 |

* cited by examiner

*Primary Examiner* — Paul Danneman
(74) *Attorney, Agent, or Firm* — Haynes and Boone, LLP

(57) ABSTRACT

When a consumer makes a purchase at a POS using a payment provider, the payment provider provides, to the merchant, a consumer identification (ID) and an authorization number, along with the payment approval. After receiving the information from the payment provider, the POS device sends a generated digital or electronic receipt to an email address of the payment provider. The email contains information about the payer and the authorization. Upon receipt, the payment provider may upload the electronic receipt into the consumer's mobile wallet or account using the payer ID and authorization number. As a result, the consumer can easily locate and access a receipt on the consumer's mobile device, such as by accessing the user's mobile wallet or the user's payment provider account on the mobile device, e.g., through a mobile app.

21 Claims, 3 Drawing Sheets

AUTOMATICALLY EMAILING RECEIPT AT POS

CROSS REFERENCE TO RELATED APPLICATION

This application is related to and claims priority to U.S. Provisional Pat. Appl. Ser. No. 61/593,726, filed Feb. 1, 2012, which is incorporated by reference in its entirety.

BACKGROUND

1. Field of the Invention

The present invention generally relates to financial transactions, and in particular, to receipt delivery.

2. Related Art

In a typical financial transaction, a consumer makes a purchase and receives a physical receipt. The receipt can be used for record-keeping, tracking purchases, and/or returns or exchanges. However, physical receipts can be cumbersome to keep and manage and can easily be lost. Recently, digital or electronic receipts are being used more often. For example, when a consumer makes an online purchase, an electronic receipt is typically sent to the consumer via email. The consumer can then organize the electronic receipt more easily, such as in an electronic folder or mailbox.

Even with the increased use of electronic receipts, physical receipts are still the most common form when the consumer makes a purchase at a physical point of sale (POS). One reason for this is that stores typically do not have a consumer's email address. Thus, if a consumer would like an electronic receipt, the consumer must provide an email address to the sales associate, which is time-consuming and inconvenient.

However, even if the electronic receipt is sent, the receipt is typically sent to the consumer's email address. This may make it difficult for the consumer to access the receipt because the consumer may not always have email availability and/or the consumer's email may change, such that any older emails may no longer be accessible.

Therefore, a need exists to easily provide electronic receipts to a consumer at a POS.

Figure 1:
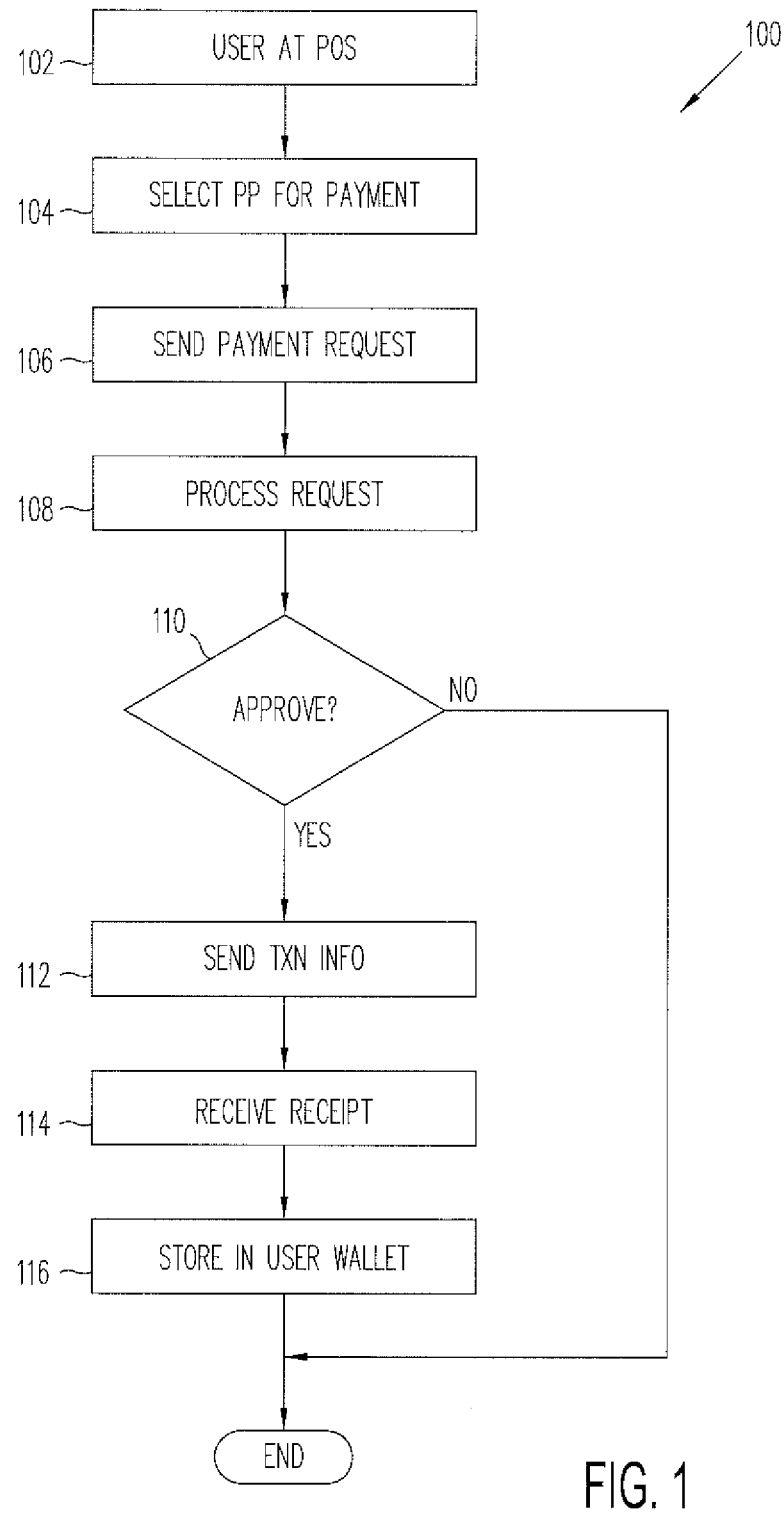
FIG. 1 is a flowchart showing a process for automatically delivering an electronic receipt at a POS according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one embodiment, when a consumer makes a purchase at a POS using a payment provider, the payment provider provides, to the merchant, a payer/consumer/user identification (ID) and an authorization number, along with the payment approval. In one embodiment, the payment provider may also send any applicable coupons, loyalty cards/points, and offers to the merchant device. After receiving the information from the payment provider, the POS device sends a generated digital or electronic receipt to an email address of the payment provider. The email contains information about the payer and the authorization. In one embodiment, this information is in the actual email address, such as "payer ID-authorization numbe"@paypalwallet.com or other email host name or domain. In another embodiment, the information is in the body or subject line of the email, where the email is sent to a more generic email address.

Upon receipt, the payment provider may upload the electronic receipt into the consumer's mobile wallet or account using the payer ID and authorization number. As a result, the consumer can easily locate and access a receipt on the consumer's mobile device, such as by accessing the user's mobile wallet or the user's payment provider account on the mobile device, e.g., through a mobile app.

Thus, the consumer can quickly and easily obtain and then access a receipt on the consumer's mobile device, without the consumer having to provide an email address to the merchant or having to access an email to locate the receipt.

FIG. 1 is a flowchart showing a process 100 for automatically delivering an electronic receipt at a POS according to one embodiment. At step 102, a user or consumer is at a merchant or seller POS ready to make a payment for a purchase. The purchase can be for anything that involves a payment by the user, including for physical items, food items, digital goods, donations, charitable contributions, etc. The POS may be unmanned, such as a self-serve kiosk, or a manned terminal with a sales associate.

When ready to make a payment, the user may select, at step 104, a payment provider, such as PayPal, Inc. of San Jose, Calif., to make the payment on behalf of the user. This may be accomplished by the sales associate conveying information to the payment provider, such as by selecting a button indicating payment using PayPal, the user selecting a payment with PayPal button on a user mobile device or a merchant terminal, such as a PIN pad, or other suitable means. The selection of the payment provider may occur at different stages of the checkout process, including before a first item is scanned, during item scanning, or after all items have been scanned and totaled. Selection may include the user providing user identification information, such as a user name, a phone number, a PIN, etc., so that the payment provider can access an account of the user with the payment provider.

Once the merchant has totaled the purchase, a payment request is sent, at step 106, to the payment provider. The purchase request may include information about the item(s), individual item amount, a total payment amount, and merchant information. Note that the payment provider, in different embodiments, may communicate coupons, loyalty cards/points, offers, and other incentives or value items to the merchant and/or user to apply to the current purchase transaction. In this case, the total amount may be reduced by any applied value items.

Based on the received information, the payment provider processes the payment request at step 108. Processing may include determining whether a valid user account exists, accessing the account, determining any restrictions or limitations on the account, such as maximum payment amount, maximum transactions, etc., location associated with the account, location of the payment request, amount of the payment request, and determining, at step 110, whether the payment request can be approved.

If the payment request cannot be approved, the merchant and/or the user may be notified. The user may be given the opportunity to resubmit authentication information or may receive a call or text, requesting additional information and/or approval. Alternatively, the user may decide to make the payment using another source, such as a credit card, cash, check, debit card, etc.

However, if at step 110, the payment request is approved, the payment provider electronically communicates, at step 112, transaction information to the merchant and/or the user. The transaction information, in one embodiment, includes a user identifier and a transaction authorization. The user identifier may be a numerical user TD, a user name, a phone number, or other information identifying the user to the payment provider. The transaction authorization may be a sequence of letters and/or numbers that uniquely identifies the transaction to the payment provider. The transaction information may also include a message that the payment request has been approved.

Upon receipt of the transaction information, the merchant device may automatically send, via email, an electronic receipt to the payment provider, which the payment provider receives at step 114. In another embodiment, the user may be given the option of having the receipt sent electronically to the payment provider for processing. The receipt may be generated any time after the payment is completed or the payment request is approved and include information such as the date of purchase, a list of items purchased, including any item identifiers and price, tax paid, discounts/coupons applied, merchant information, transaction number, etc.

The email may include the user ID and transaction authorization ID. In one embodiment, the information is contained in the email address. The local part or user name portion of the email address may include the user ID and the transaction ID. Examples include "user ID-transaction ID," "transaction ID-user ID," "userIDtransactionID," and "transactionIDuserID." The domain name may include the payment provider, e.g., "paypalwallet.com." Thus, in one example, assuming the user ID is jsmith123, and the transaction ID is XcrP38, the email sent to the payment provider may be jsmith123-XcrP38@paypalwallet.com. In another embodiment, the user ID and/or transaction ID are included in the subject heading and/or the body of the email. In another example, the email may be jsmith123@paypalwallet.com, with a subject header or body referencing transaction authorization ID XcrP38. As such, the payment provider can easily identify that the received email is for a user's wallet, locate the user using the user ID, and associate the receipt with the transaction ID. Additional information may be included in the local part as desired.

The payment provider may then store the electronic receipt, at step 116, in the user's mobile wallet or account in a cloud. The mobile wallet may reside on the user's mobile device, such as a smart phone. The user may access the receipt by accessing the mobile wallet, such as through a mobile app on the device. The user may also access the receipt by logging onto the user's account with the payment provider, either online, through a mobile browser, or through a mobile app. Once in the account, the user may locate and view the receipt, such as using a search function, under a tab or link, etc. The receipt may be organized by date of purchase, merchant, amount, etc.

As a result, the user can easily obtain and later access an electronic receipt through the user's mobile device. The user does not have to worry about a paper receipt, have to give the sales associate the user's email address, or try to find the receipt in an email folder.

Figure 2:
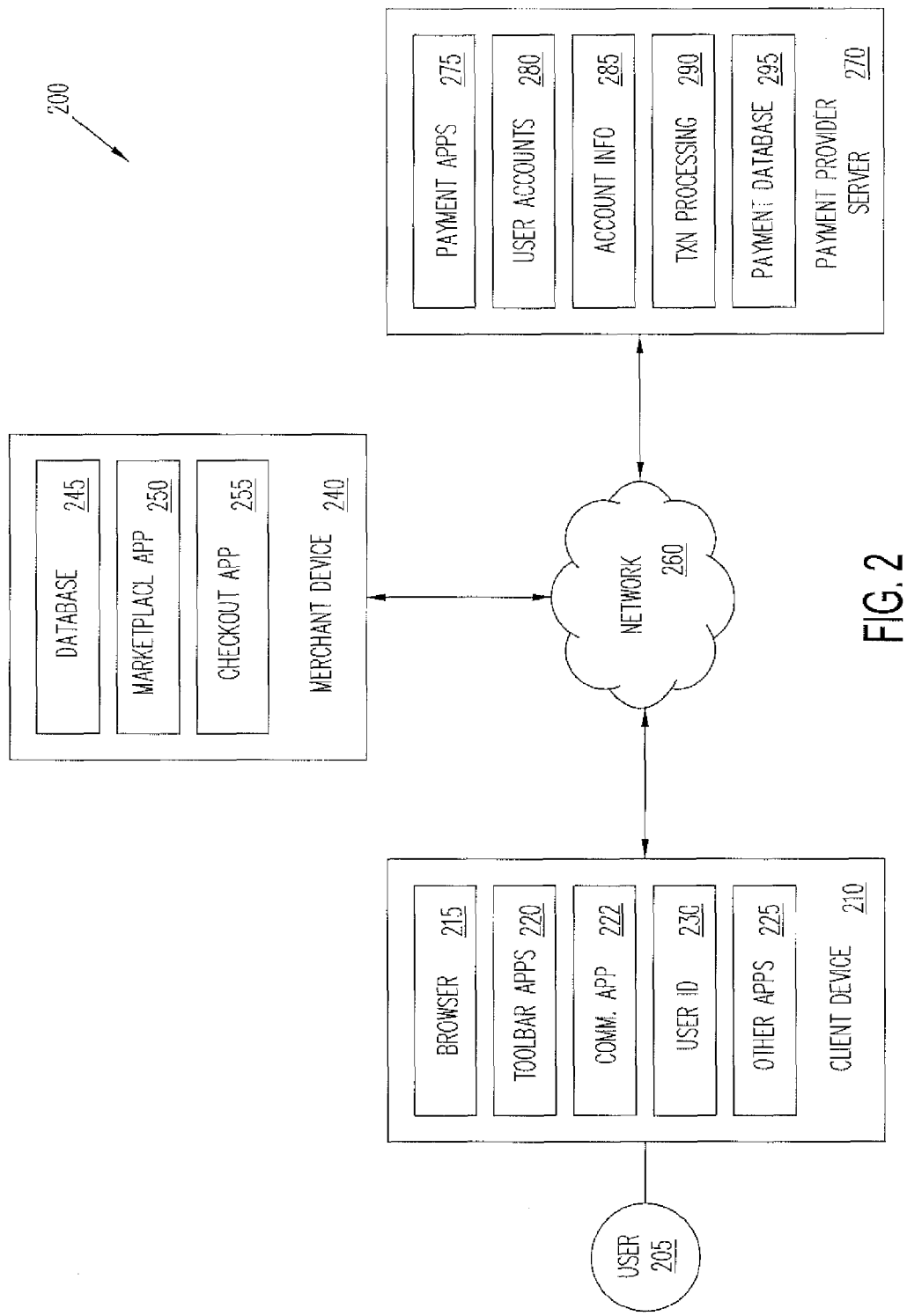
FIG. 2 is a block diagram of a networked system suitable for implementing the process of FIG. 1 according to an embodiment.

FIG. 2 is a block diagram of a networked system 200 configured to handle a financial transaction between a payment recipient (e.g., merchant) and a payment sender (e.g., user or consumer) at a POS, such as described above, in accordance with an embodiment of the invention. System 200 includes a user device 210, a merchant server 240, and a payment provider server 270 in communication over a network 260. Payment provider server 270 may be maintained by a payment provider, such as PayPal, Inc. of San Jose, Calif. A user 205, such as the sender or consumer, is associated with user device 210, where the user performs a payment transaction with merchant server 240 using payment provider server 270.

User device 210, merchant server 240, and payment provider server 270 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

Network 260 may be implemented as a single network or a combination of multiple networks. For example, in various embodiments, network 260 may include the Internet or one or more intranets, landline networks, wireless networks, and/or other appropriate types of networks.

User device 210 may be implemented using any appropriate hardware and software configured for wired and/or wireless communication over network 260. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 210 may include one or more browser applications 215 which may be used, for example, to provide a convenient interface to permit user 205 to browse information available over network 260. For example, in one embodiment, browser application 215 may be implemented as a web browser configured to view information available over the Internet. User device 210 may also include one or more toolbar applications 220 which may be used, for example, to provide client-side processing for performing desired tasks in response to operations selected by user 205. In one embodiment, toolbar application 220 may display a user interface in connection with browser application 215 as described herein.

User device 210 may further include other applications 225 as may be desired in particular embodiments to provide desired features to user device 210. For example, other applications 225 may include security applications for implementing client-side security features, programmatic client applications for interfacing with appropriate application programming interfaces (APIs) over network 260, or other types of applications. Applications 225 may also include email, texting, voice and IM applications that allow user 205 to send and receive emails, calls, and texts through network 260, as well as applications that enable the user to communicate, place orders, and make payments through the payment provider as discussed above. User device 210 includes one or more user identifiers 230 which may be implemented, for example, as operating system registry entries, cookies associated with browser application 215, identifiers associated with hardware of user device 210, or other appropriate identifiers, such as used for payment/user/device authentication. In one embodiment, user identifier 230 may be used by a payment service provider to associate user 205 with a particular account maintained by the payment provider as further described herein. A communications application 222, with associated interfaces, enables user device 210 to communicate within system 200.

Merchant server 240 may be in communication with a PIN pad and/or a cash register for entry and transmission of user information, as discussed above, both of which are not shown here. Merchant server 240 may also or alternatively be in communication with user device 210 and payment provider server 270 to communicate information. Merchant server 240 may be maintained, for example, by a merchant or seller offering various products and/or services in exchange for payment to be received over network 260. Generally, merchant server 240 may be maintained by anyone or any entity that receives money, which includes charities as well as retailers and restaurants. Merchant server 240 includes a database 245 identifying available products and/or services (e.g., collectively referred to as items) which may be made available for viewing and purchase by user 205, including receipts associated with identifiers, such as barcodes. Accordingly, merchant server 240 also includes a marketplace application 250 which may be configured to serve information over network 260 to browser 215 of user device 210. In one embodiment, user 205 may interact with marketplace application 250 through browser applications over network 260 in order to view various products, food items, or services identified in database 245.

Merchant server 240 also includes a checkout application 255 which may be configured to facilitate the purchase by user 205 of goods or services identified by marketplace application 250. Checkout application 255 may be configured to accept payment information from or on behalf of user 205 through payment service provider server 270 over network 260. For example, checkout application 255 may receive and process a payment confirmation from payment service provider server 270, as well as transmit transaction information to the payment provider and receive information from the payment provider. Checkout application 255 may also be configured to accept one or more different funding sources for payment, as well as create an electronic invoice or receipt of the transaction, which can be communicated to payment provider server 270.

Payment provider server 270 may be maintained, for example, by an online payment service provider which may provide payment between user 205 and the operator of merchant server 240. In this regard, payment provider server 270 includes one or more payment applications 275 which may be configured to interact with user device 210 and/or merchant server 240 over network 260 to facilitate the purchase of goods or services by user 205 of user device 210 at a merchant POS or site as discussed above.

Payment provider server 270 also maintains a plurality of user accounts 280, each of which may include account information 285 associated with individual users. For example, account information 285 may include private financial information of users of devices such as account numbers, passwords, device identifiers, user names, phone numbers, credit card information, bank information, PINs/passwords, coupons, discounts, incentives, loyalty points, value items, or other financial information which may be used to facilitate online transactions by user 205. Merchant details may also be stored within account information 285 or another part of payment provider server 270. Advantageously, payment application 275 may be configured to interact with merchant server 240 on behalf of user 205 during a transaction with checkout application 255 to track and manage purchases made by users and which funding sources are used.

A transaction processing application 290, which may be part of payment application 275 or separate, may be configured to receive information from a user device and/or merchant server 240 for processing and storage in a payment database 295. Transaction processing application 290 may include one or more applications to process information from user 205 for processing an order and payment at a merchant POS as described herein. As such, transaction processing application 290 may store details of an order associated with transaction between a merchant and user. Payment application 275 may be further configured to generate a user ID (if needed) and/or a transaction ID to transmit to the merchant for receiving an email with an electronic receipt in return, as described herein.

Payment database 295 may store transaction details from completed transactions, including authorization details and/or details of the transaction, including electronic receipts. Such information may also be stored in a third party database accessible by the payment provider and/or the merchant.

Figure 3:
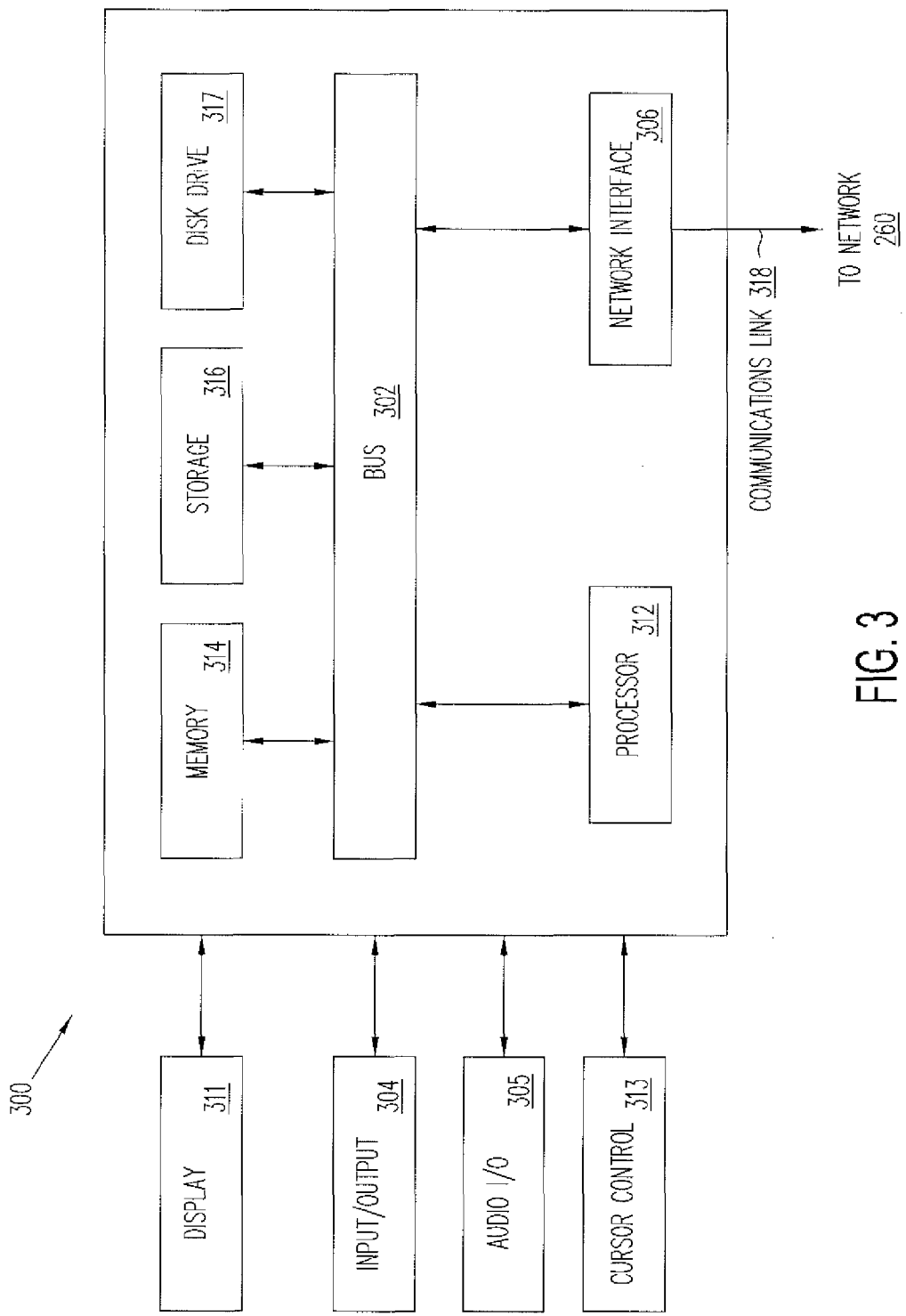
FIG. 3 is a block diagram of a computer system suitable for implementing one or more components in FIG. 2 according to one embodiment of the present disclosure.

FIG. 3 is a block diagram of a computer system 300 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 300 in a manner as follows.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component, such as a display 311 and a cursor control 313 (such as a keyboard, keypad, mouse, etc.). An optional audio input/output component 305 may also be included to allow a user to use voice for inputting information by converting audio signals. Audio I/O component 305 may allow the user to hear audio. A transceiver or network interface 306 transmits and receives signals between computer system 300 and other devices, such as another user device, a merchant server, or a payment provider server via network 360. In one embodiment, the transmission is wireless, although other transmission mediums and methods may also be suitable. A processor 312, which can be a micro-controller, digital signal processor (DSP), or other processing component, processes these various signals, such as for display on computer system 300 or transmission to other devices via a communication link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical or magnetic disks, volatile media includes dynamic memory, such as system memory component 314, and transmission media includes coaxial cables, copper wire, and fiber optics, including wires that comprise bus 302. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a memory of a payment provider server storing information about user accounts, where the information comprises user identifiers and transaction identifiers; and
   one or more hardware processors of the payment provider server in communication with the memory, wherein the one or more processors performs:
   receiving a request for payment for a financial transaction at the payment provider server;
   processing the request for payment at the payment provider server;
   transmitting a user identifier and a transaction identifier for the financial transaction from the payment provider server to a merchant if the request for payment is approved;
   receiving an email at the payment provider server from the merchant comprising an electronic receipt for the financial transaction, the user identifier, and the transaction identifier for the financial transaction; and
   storing the electronic receipt in a user's mobile wallet.

2. The system of claim 1, wherein the financial transaction is at a POS of the merchant.

3. The system of claim 1, wherein the electronic receipt is stored in a cloud.

4. The system of claim 1, wherein the mobile wallet is accessible from a user's mobile device.

5. The system of claim 1, wherein the email is received automatically from a merchant device.

6. The system of claim 1, wherein the email is received at an email address that comprises a local portion comprising the user identifier and the transaction identifier, and wherein the email address further comprises a domain name of the payment provider server.

7. The system of claim 1, wherein the one or more processors further performs communicating to the user or the merchant one or more value items that can be used for the financial transaction.

8. A method of processing a financial transaction, comprising:
   receiving, by a processor of a payment provider server, a request for payment for the financial transaction at the payment provider server;
   processing, by the processor, the request for payment at the payment provider server;
   transmitting, electronically by the processor, a user identifier and a transaction identifier for the financial transaction from the payment provider server to a merchant if the request for payment is approved;
   receiving, electronically by the processor, an email at the payment provider server comprising an electronic receipt for the financial transaction, the user identifier, and the transaction identifier for the financial transaction; and
   storing the electronic receipt in a user's digital mobile wallet.

9. The method of claim 8, wherein the financial transaction is at a POS of the merchant.

10. The method of claim 8, wherein the electronic receipt is stored in a cloud.

11. The method of claim 8, wherein the mobile wallet is accessible from a user's mobile device.

12. The method of claim 8, wherein the email is received automatically from a merchant device.

13. The method of claim 8, wherein the email is received at an email address that comprises a local portion comprising the user identifier and the transaction identifier.

14. The method of claim 8, further comprising communicating to the user or the merchant one or more value items that can be used for the financial transaction.

15. A non-transitory machine-readable medium comprising a plurality of machine-readable instructions which when executed by one or more processors of a server are adapted to cause the server to perform a method comprising:

receiving, by a payment provider server, a request for payment for a financial transaction at the payment provider server;

processing the request for payment at the payment provider server;

transmitting a user identifier and a transaction identifier for the financial transaction from the payment provider server to a merchant if the request for payment is approved;

receiving an email at the payment provider server comprising an electronic receipt for the financial transaction, the user identifier, and the transaction identifier for the financial transaction; and storing the electronic receipt in a user's digital mobile wallet.

16. The non-transitory machine-readable medium of claim 15, wherein the financial transaction is at a POS of the merchant.

17. The non-transitory machine-readable medium of claim 15, wherein the electronic receipt is stored in a cloud.

18. The non-transitory machine-readable medium of claim 15, wherein the mobile wallet is accessible from a user's mobile device.

19. The non-transitory machine-readable medium of claim 15, wherein the email is received automatically from a merchant device.

20. The non-transitory machine-readable medium of claim 15, wherein the email is received at an email address that comprises a local portion comprising the user identifier and the transaction identifier.

21. The non-transitory machine-readable medium of claim 15, wherein the method further comprises communicating to the user or the merchant one or more value items that can be used for the financial transaction.

\* \* \* \* \*

UNITED STATES PATENT AND TRADEMARK OFFICE
CERTIFICATE OF CORRECTION

| | | |
|---|---|---|
| PATENT NO. | : 9,087,327 B2 | Page 1 of 1 |
| APPLICATION NO. | : 13/757314 | |
| DATED | : July 21, 2015 | |
| INVENTOR(S) | : Attaullah Mirza Baig | |

It is certified that error appears in the above-identified patent and that said Letters Patent is hereby corrected as shown below:

In the Claims

In column 8 line 55, delete the word "digital" between the words "user's" and "mobile"

In column 9 line 20, delete the word "digital" between the words "user's" and "mobile"

Signed and Sealed this
Twenty-fourth Day of November, 2015

Michelle K. Lee
*Director of the United States Patent and Trademark Office*